United States Patent [19]

Rocchitelli

[11] Patent Number: 4,508,957
[45] Date of Patent: Apr. 2, 1985

[54] THERMOSTATICALLY CONTROLLED ELECTRIC HEATING DEVICE FOR MOTOR VEHICLE GLASS WASHING FLUID

[76] Inventor: Onofrio Rocchitelli, 31, Via per Lainate, I 20010 Pogliano Milanese, Province of Milano, Italy

[21] Appl. No.: 530,534

[22] Filed: Sep. 9, 1983

[30] Foreign Application Priority Data

Sep. 24, 1982 [IT] Italy ............................. 23017/82[U]
Mar. 2, 1983 [IT] Italy ............................. 20986/83[U]

[51] Int. Cl.³ .......................... B60S 1/46; B67D 5/62; H05B 1/02; F24H 1/10
[52] U.S. Cl. ................................. 219/305; 15/250.05; 137/341; 219/296; 219/308; 222/146.5; 239/133; 239/135; 239/184
[58] Field of Search ............................... 219/296-299, 219/301-305, 308, 309, 203; 128/203.27; 137/341; 15/250.05; 239/133, 135, 184; 222/146 HE, 146 R

[56] References Cited

U.S. PATENT DOCUMENTS

| 941,215 | 11/1909 | Wade | 219/303 |
|---|---|---|---|
| 1,523,156 | 1/1925 | Adams | 219/305 |
| 2,833,909 | 5/1958 | Levey | 219/298 |
| 3,338,476 | 8/1967 | Marcoux | 239/135 X |
| 3,891,827 | 6/1975 | Wyse | 219/305 X |
| 4,177,375 | 12/1979 | Meixner | 219/308 |
| 4,212,425 | 7/1980 | Schlick | 137/341 X |
| 4,430,994 | 2/1984 | Clawson et al. | 128/203.27 |

FOREIGN PATENT DOCUMENTS

| 222081 | 6/1959 | Australia | 219/303 |
|---|---|---|---|
| 854403 | 11/1952 | Fed. Rep. of Germany | 219/305 |
| 370687 | 4/1932 | United Kingdom | 219/307 |

Primary Examiner—A. Bartis
Attorney, Agent, or Firm—McAulay, Fields, Fisher, Goldstein & Nissen

[57] ABSTRACT

An electric heating device for heating motor vehicle glass washing fluid includes a pair of plate-like non-metallic body elements each having a spiral channel formed therein and sealingly closed by a copper cover plate. The cover plates are juxtaposed and sandwiched therebetween an electric heating element in the form of a PTC thermistor connected to the vehicle battery through a suitable switch. A thermostat is connected in series with the thermistor and is mounted on and responsive to the temperature of one of the cover plates. The thermistor is calibrated to reach a temperature substantially higher than the desired fluid temperature to ensure rapid heating of the fluid and the thermostat as activated at the desired fluid temperature to prevent overheating of the fluid. The spiral channels are connected in series at one end and the opposite ends thereof are connected, respectively, to a washing fluid reservoir and spray nozzles for spraying heated fluid on the vehicle glass. The fluid being heated may be pumped through the spiral channels by a pump mounted on the device and having an impeller located in a chamber formed in one of the body elements.

10 Claims, 7 Drawing Figures

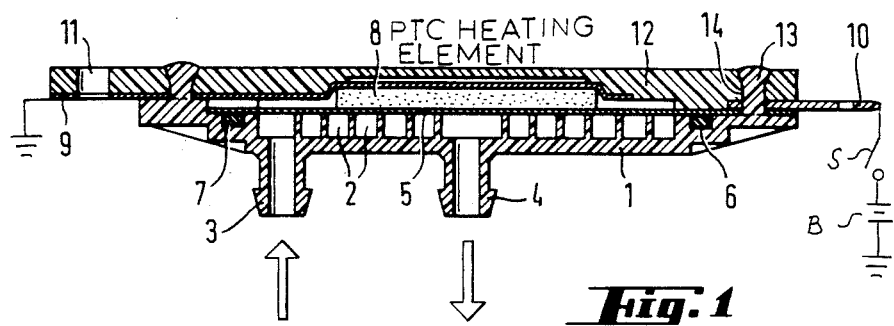
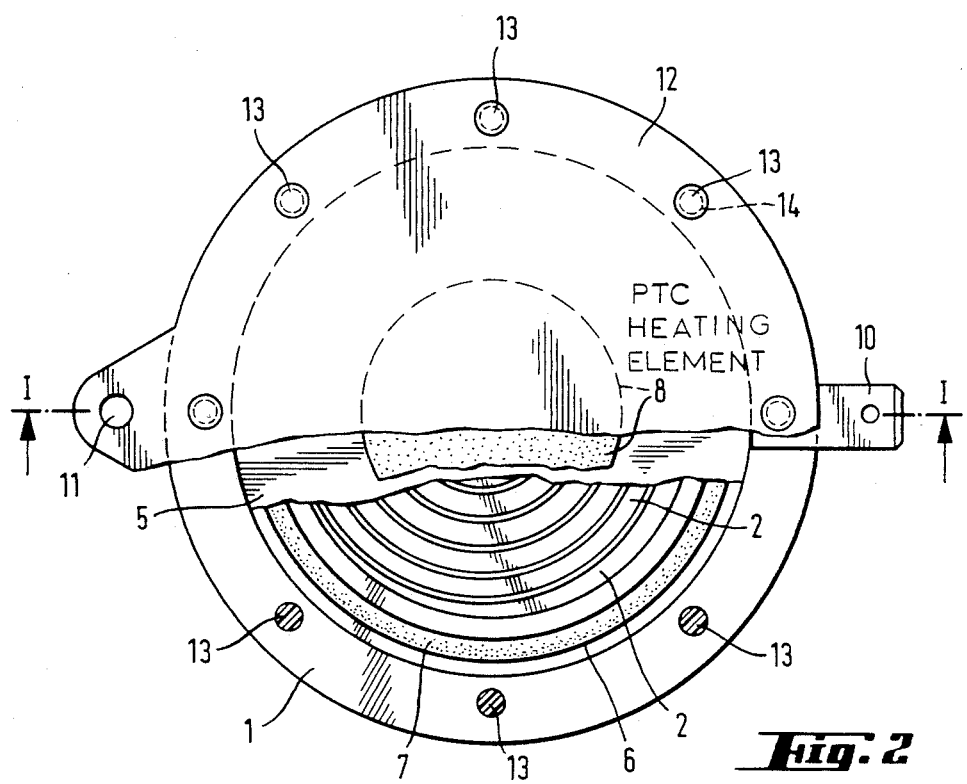

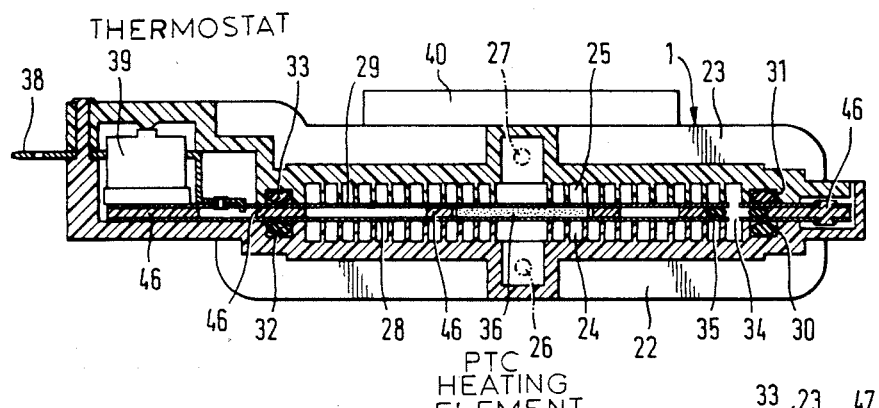
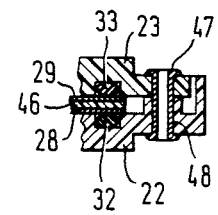
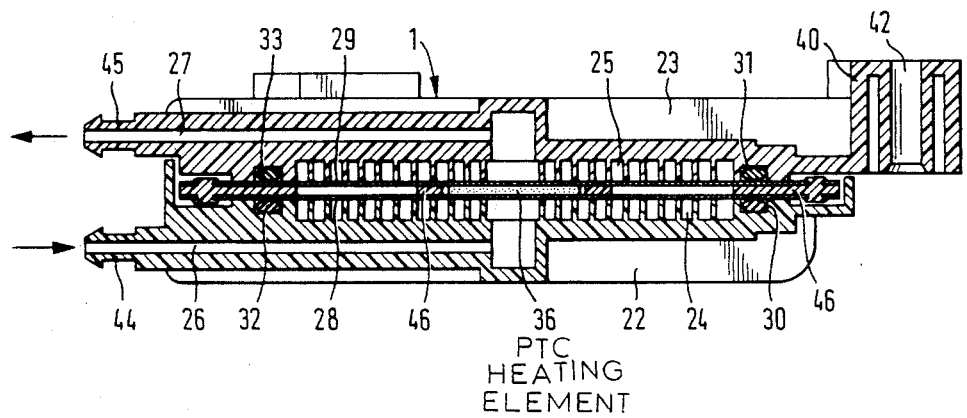

THERMOSTATICALLY CONTROLLED ELECTRIC HEATING DEVICE FOR MOTOR VEHICLE GLASS WASHING FLUID

BACKGROUND OF THE INVENTION

The present invention relates to a heating device for the glass washing fluid used in motor vehicles and like machines.

In order to obtain a sufficient visibility when driving in adverse weather conditions, all motor vehicles are provided at least with a windshield wiper, and often also with a rear window wiper and headlight wipers, and these wipers are generally provided with nozzles spraying a detergent fluid (water or water admixed with detergent liquids).

It is also well known that the present huge development of private traffic joined with a considerable lack (especially in towns) of indoor parking spaces, compels one leaving one's motor vehicle to leave outdoors, day and night, and in the cold season it frequently happens that motor vehicle glass is found in the morning to be covered with a layer of ice or frost, which has to be removed and to this purpose it is necessary to dissolve it with warm water or to wipe it away with other means.

It has also been noted that, if said motor vehicle glass is cleaned with warm water, cleaning is effected in a much shorter time, is more accurate even when carried out only with the blades of the electric wipers, otherwise in most cases cleaning must be completed by hand, even when using water admixed with detergent substances.

SUMMARY OF THE INVENTION

The object of the present invention is to solve the problem of an efficient and simple cleaning of motor vehicle glass using only the wiper blades and as cleaning fluid, warm water at a temperature of about 40°-60° C. so as to obtain a rapid and complete cleaning and glass defrosting without being compelled to use other means.

The problem is solved by inserting in the circuit going to the nozzles spraying fluid on glasses having blade wipers, a water heating device which has safety features, does not cause damages to itself or to the elements containing it, in case it remains turned on in absence of fluid feed, has a low consumption of electric current and operates in a quick and reliable way.

Such a heating device consists of at least one plate-like body element in which a spiral channel is made, having two communications with the outside, namely an inlet and an outlet, said channel being sealingly closed by a plate cover made of copper or similar good heat conductor, a heating element being externally superposed to said plate and consisting of PTC (Positive Temperature Coefficient) thermistor, connected through a suitable switch to the two poles of the motor vehicle battery, the channel inlet being connected to the line coming from the washing fluid reservoir provided with a pump, and the channel outlet being connected to the spraying nozzles, so that water enters the inlet cold and goes out warm from the outlet.

Taking advantage of the characteristics of thermistors which, reach the calibrated temperature in a very short time and hold it indefinitely with a minimum current consumption, the optimal conditions are created, which should be met by the device of the invention, namely: production of water at a predetermined temperature, which is the highest temperature compatible with a low consumption of electric current and maximum reliability of its operation.

BRIEF DESCRIPTION OF THE DRAWINGS

The device of the invention will be better understood having recourse to two embodiments given as non-limiting examples only, the first embodiment being provided with one plate only and the second embodiment with two plates, reference being had to the accompanying drawings, in which:

FIG. 1 is a lateral section, taken on line I—I of FIG. 2, of the one plate embodiment of the device of the invention;

FIG. 2 is a partially sectioned plan view of said one plate embodiment;

FIG. 4 is a cross-sectional view of the two plate embodiment, taken along line IV—IV of FIG. 3;

FIG. 5 is a cross-sectional view of the two plate embodiment, taken along line V—V of FIG. 3;

FIG. 6 is a sectional detail of the assembling system of the various elements of the two plate embodiment.

DETAILED DESCRIPTION OF THE PREFERRED EMBODIMENT

Figure 3:
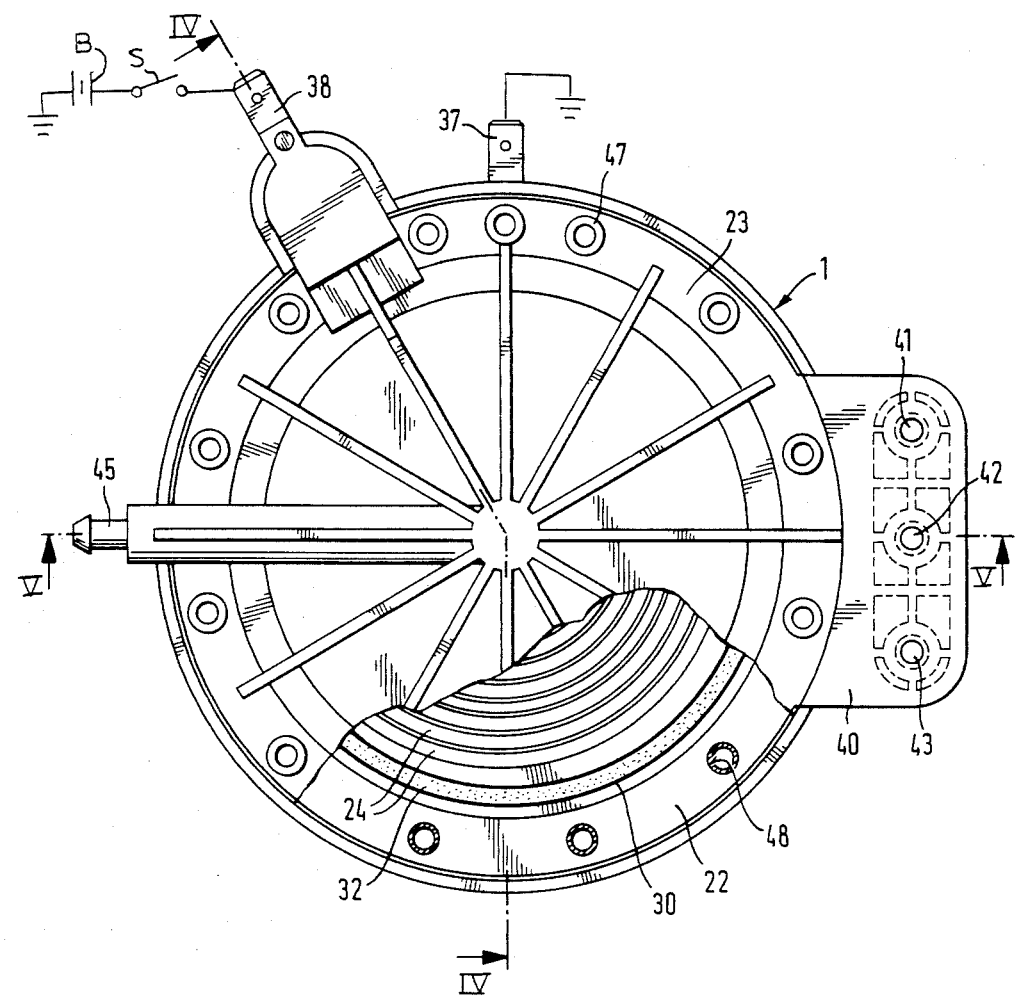
FIG. 3 is a partially sectioned plan view of the two plate embodiment.

With reference now to FIGS. 1 and 2, the device according to the present invention consists of a plate-like body 1, made of a poor heat conductor, in which there is a spiral channel 2, provided at its ends with two fittings 3 and 4 putting it in communication with the outside. Said channel 2 is then closed at the top by a plate 5 of a material with a high heat transmission coefficient, such as copper and the like.

Plate 5 is joined to the body 1 so as to make on it a water tight cover, and the channel is therefore acting as a coil; to this end on the body 1, externally to the spiral channel 2, there is a circular groove 6 in which an O-ring 7 is placed. Above the plate 5, and in close contact with it, there is the power thermistor 8 adapted to reach a temperature allowing that the water flow normally required by the spraying nozzles of a motor vehicle, entering the device at room temperature, goes out from the outlet at a temperature of about 50°-60° C.

The thermistor 8 is disposed between plate 5 and a contact plate 9, both in electrical contact therewith.

The thermistor is connected to the motor vehicle ground, for instance using for this purpose via contact 9 using the hole 11 to connect the device to the structure of said motor vehicle. The thermistor is connected through a switch S or similar device to the positive current line of battery B via the contact 10 which is electrically connected to plate 5.

A cover 12 made of the same poor heat conductor of body 1 completes the device and is joined to the body by means of riveted pins 13 passing through the conjugate holes 14 peripherally made in cover 12 and the body 1 so as to hold firmly and securely joined the various elements of the device.

The operation of the device is as follows. The device is fixed at a suitable point of the vehicle body in the motor compartment by a bolt passing through the hole 11 so that the contact 9 is connected to the negative circuit (ground) of the electrical equipment; the device is inserted on the fluidic circuit downstream of the pump delivering the fluid contained in the reservoir to the spraying nozzles, interrupting the pipe provided for this delivery i.e. connecting fitting 3 with the pipe portion coming from the pump and fitting 4 with the pipe portion going to the nozzles, so that cold water before going to the nozzles enters the fitting 3 and goes out from fitting 4, after having been heated when electric power is supplied to thermistor 8.

In order to make quicker and immediate operation of the device, to obtain a more complete employment of the heat produced by the PTC thermistor and improve the operative conditions of it, a second embodiment of the device is provided, having two plates (instead of one), each having its own spiral channel covered by a copper plate, between which the thermistor is placed, said two channels being series connected, so that the length of the fluid heating path and therefore the quantity of fluid contained in the heating device is doubled.

Moreover, in order to decrease the water heating time at engine starting, it is possible use a thermistor calibrated at a temperature much higher than that of the outgoing water, the latter being then regulated by a thermostat connected in series with the thermistor.

Referring now to FIGS. 3, 4 and 5, the second embodiment of the device of the invention consists of a body 1 made of a poor heat conductor and divided into two halves 22 and 23, having the shape of a circular plate, each of them being provided with a spiral channel 24 and 25; each of these channels is connected at one end with a fitting duct 26 and 27, respectively (see FIG. 5), each provided in the corresponding circular plate 22 and 23, and putting the relevant channel in communication with the outside.

Each channel 24 and 25 is then closed at the top by a cover 28 and 29, respectively, made of a plate of a material having a high heat transmission coefficient, such as copper and the like.

Plate covers 28 and 29 are joined to each relevant half body 22 and 23, so as to form on each of them a fluid tight seal, and each channel practically forms a coil, and for this purpose in the body halves 22 and 23, externally to the spiral channels 24 and 25, there are two circular grooves 30 and 31 in which corresponding O-Rings 32 and 33 are placed.

The two channels 24 and 25 are connected to one another at their relevant ends opposite to those connected with the fitting pipes 26 and 27, through a hole 34 made at that point in the covers 28 and 29, and a fluid seal is obtained through a O-Ring 35 arranged around the holes 34 between the covers 28 and 29.

Between said covers 28 and 29, and in close contact with them, there is the power thermistor 36 calibrated at a rather high temperature so that the quantity of water contained in the device and that normally required by the spraying nozzles of a motor vehicle, may be brought from a temperature of about 5°–6° C. at the inlet, to a temperature of about 50°–60° C. at the outlet in a very short time, for instance of about 20 seconds. In order to hold the covers 28 and 29 in a coplanar position in every part, a spacer 46 is arranged between them.

Thermistor 36 is electrically connected to the vehicle ground by the contact 37 which is electrically connected to cover 28 which in turn is electrically connected to thermistor 36. The thermistor 36 is connected through a switch S or similar device and to the positive current line of battery B by contact 38 which is in electrical contact with plate 29 via thermostat 39, cover 29 being in electrical contact with theremistor 36.

Between thermistor 36 and contact 38 there is thermostat 39 being in contact with one of the two heat conductive plates or covers 28 and 29, (although shown in contact with cover 29) and has a simple safety function, in case the user forgets to turn off the device after its use, to avoid the overheating of the water in the channel, in the absence of water circulation since the theristor is calibrated to a much higher temperature for than the thermostat, obtaining warm water in a very short time the thermostat will open the series circuit when its lower set temperature is reached.

The device is completed by the fact that the one of the body halves, for instance body half 23 as shown in the figures, has a projecting part 40 provided with three holes 41, 42, 43, for mounting the device with one, two or three bolts or screws in the motor compartment of the vehicle.

Finally, the two fitting pipes 26 and 27 connecting the channels 24 and 25 with the outside, are projecting outside each body half 22 and 23 with a protrusion having the form of the hose union 44 and 45.

The operation of this embodiment is as follows. The device is fixed at a suitable point of the vehicle body in the motor compartment, by means of bolts or screws passing through one or more of holes 41, 42, 43; the two fast-on contacts 37 and 38 are connected to the electric circuitry of the vehicle; the device is inserted in the washing fluid circuit downstream the pump delivering the fluid contained in the reservoir to the spraying nozzles, cutting the delivery duct and connecting to the two portions so obtained either of the hose unions 44 and 45, for instance union 44 with the duct portion coming from the pump and the other union 45 with the duct portion going to the nozzles, so that cold water before reaching the spraying nozzles enters the device from union 44, flow throughout channel 24, passes through hole 34 made in covers 28 and 29, flows throughout channel 25 and goes out warm from the device outlet union 45, because of heat taken from covers 28 and 29 and therefore from thermistor 36 properly turned on by the user.

It was found that the device of the present invention may bring water contained in it to a temperature of about 50°–60° C. in a few seconds with a low current consumption and in case of fortuitous switching on of the thermistor, even in absence of water, there is no inconvenience because of the actuation of thermostat 39.

In order to hold assembled the parts of the device so as to form an integral body, rivets 47 are used, passing through conjugated holes 48 made on the peripheral edge of body 1 of the device, as shown in FIG. 6.

The above illustrated embodiments were given as non limiting examples only, as the invention may be practically carried out with many variations which are also falling within the scope of the invention. More particularly, it has to be noted that instead of a thermistor, as a heating element even a normal nickel-chrome plate electric resistance may be used, although this latter system does not achieve the same performance of a PTC thermistor, because the structure of the several elements of the device contribute to obtaining the results which are the object of the invention.

Finally, with the device of the present invention, with a slight modification of the body or of one of the two body halves, it is possible to make integral also the spraying pump.

Figure 7:
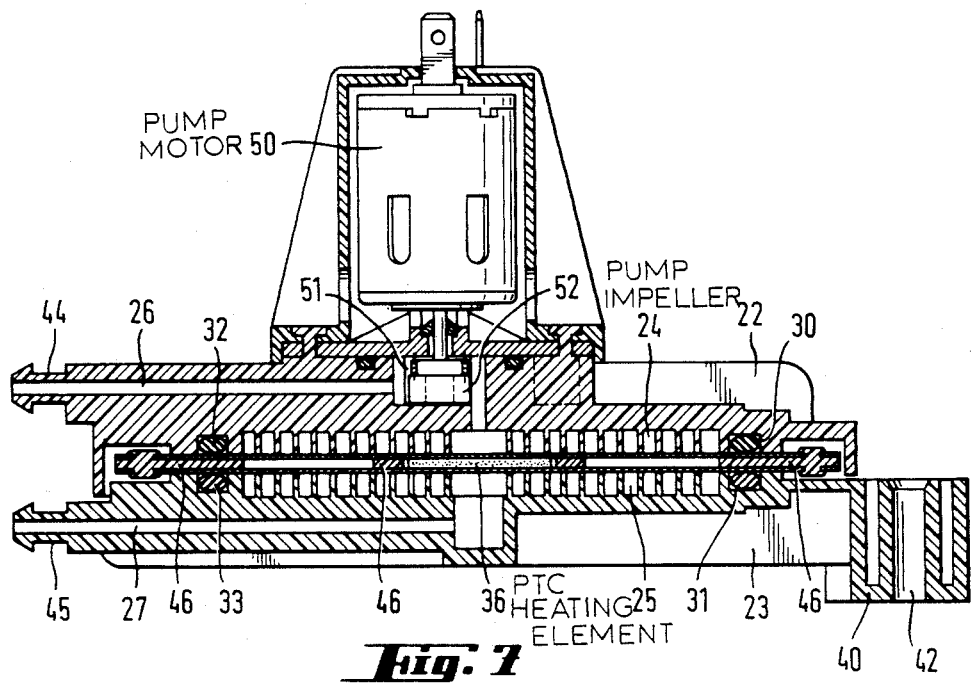
FIG. 7 is a showing of a combined application of the device of the present invention.

To obtain this and as shown in FIG. 7, it is sufficient to make for instance in the body half 22 at the point where the suction pipe 26 is placed, a chamber 51 adapted to receive the impeller 52 of a little pump 50, e.g. of the positive displacement type, so as to enclose in a single compact apparatus both the pump and the heater.

I claim:

1. Heating device for the glass washing fluid of motor vehicles and the like, consisting of at least one plate-like body element in which a spiral channel is made, said channel having two communications with the outside, namely an inlet and an outlet, said channel being sealingly closed by a plate cover, a heating element being externally superposed to said plate in heat exchange relation to heat the fluid to a desired temperature and consisting of a PTC (Positive Temperature Coefficient) thermistor, and adapted to be connected through a suitable switch to the two poles of the motor vehicle battery, a thermostat connected in series with the thermistor and arranged on the plate cover so as to be responsive to the temperature thereof, wherein the thermistor is calibrated to reach a temperature substantially higher than said desired temperature and said thermostat is activated at the desired temperature, the channel inlet adapted to be connected to a line coming from the washing fluid reservoir provided with a pump, and the channel outlet adapted to be connected to spraying nozzles, so that water enters the inlet cold and goes out warm from the outlet.

2. Heating device according to claim 1, wherein the body consists of two plate-like body elements each having a spiral channel made in it, each channel being provided at one of its ends with a pipe fitting putting it in communication with the outside, while the opposite ends of said channels are connected to one another, so that the two channels are series connected, each channel being sealingly closed by a plate cover between which said heating elements is placed, the two pipe fittings adapted to be inserted in the washing fluid circuit between a washing fluid reservoir and pump and spraying nozzles, so that cold water enters the device at one fitting and goes out warm from the other.

3. Heating device according to claim 2, wherein the two body elements are made of a poor heat conductor.

4. Heating device according to claim 2, wherein a fluid tight seal between the body element and the edge of the respective plate covers is obtained by means of O-Rings arranged in grooves made in the body elements externally to the spiral channels.

5. Heating device according to claim 2, wherein that the passage of the washing fluid between the series connected channels of the body elements is obtained through aligned holes made in the plate covers at the point where are located the conjugate ends of said channels opposite the those connected to the pipe fittings, the fluid tight seal in such a point being obtained through an O-Ring placed between the two plates around the holes.

6. Heating device according to claim 2, wherein the pipe fittings putting the other end of the channels in communication with the outside project from the corresponding body elements by means of hose unions for their easy connection to the ducts of the delivery circuit of the spraying pump.

7. Heating device according to claim 2, wherein the two body elements and all parts enclosed therebetween, are held assembled together by means of rivets passing through conjugated holes made on the edges of the body elements.

8. Heating device according to claim 1, wherein a fluid tight seal of the edge of the plate cover to the body element is obtained by means of an O-Ring arranged in a groove made in the body element externally to the spiral channel.

9. Heating device according to claim 1, further comprising, a pump connected at the fluid suction side of the device, and a chamber receiving an impeller of said pump.

10. Heating device according to claim 1 or 2, wherein the plate cover covering the spiral channel is made of a good heat conductor.

* * * * *